US012688945B2

(12) United States Patent
Bays et al.

(10) Patent No.: US 12,688,945 B2
(45) Date of Patent: Jul. 21, 2026

(54) INTEGRATED REACTOR SHIELD STRUCTURES AND INTEGRATED PRESSURE VESSEL STRUCTURES

(71) Applicant: Battelle Energy Alliance, LLC, Idaho Falls, ID (US)

(72) Inventors: Samuel E. Bays, Idaho Falls, ID (US); Abderrafi M. Ougouag, Idaho Falls, ID (US); Ting-Leung Sham, Idaho Falls, ID (US); Joshua N. Zelina, Idaho Falls, ID (US); Ryan H. Stewart, Pocatello, ID (US); Adam X. Zabriskie, Idaho Falls, ID (US); Robert C. O'Brien, Idaho Falls, ID (US); Robert E. Spears, Idaho Falls, ID (US); Adrian R. Wagner, Idaho Falls, ID (US); Kyler E. Egan, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 18/787,204

(22) Filed: Jul. 29, 2024

(65) Prior Publication Data

US 2025/0037887 A1 Jan. 30, 2025

Related U.S. Application Data

(60) Provisional application No. 63/516,109, filed on Jul. 27, 2023.

(51) Int. Cl.
*G21C 11/02* (2006.01)
*G21C 11/08* (2006.01)

(52) U.S. Cl.
CPC .......... *G21C 11/028* (2013.01); *G21C 11/086* (2013.01)

(58) Field of Classification Search
CPC ............................ G21C 11/028; G21C 11/086
See application file for complete search history.

(56) References Cited

U.S. PATENT DOCUMENTS

| | | | | | |
|---|---|---|---|---|---|
| 3,016,462 | A * | 1/1962 | Hendricksen | G21F 1/125 | 376/294 |
| 3,016,463 | A * | 1/1962 | Needham | G21C 13/087 | 376/294 |
| 3,056,028 | A * | 9/1962 | Mattingly | G21F 1/12 | 976/DIG. 335 |
| 3,433,382 | A * | 3/1969 | George Boggio | B21D 51/24 | 220/660 |
| 3,503,171 | A * | 3/1970 | Frohly | G21C 13/0933 | 52/249 |

(Continued)

OTHER PUBLICATIONS

Stewart, Ryan H., et al. "Mass Optimization of a Multilayered Shield for Transportable Microreactors." Nuclear Science and Engineering (2024): 1-14. (Year: 2024).*

(Continued)

*Primary Examiner* — Lily C Garner
(74) *Attorney, Agent, or Firm* — TraskBritt

(57) ABSTRACT

An integrated reactor shield structure includes radially adjacent layers. Each layer includes radially extending walls defining cells and a sheet surrounding the radially extending walls. Biologic shielding material is disposed in each of the cells. Integrated pressure vessel structures are also disclosed.

23 Claims, 7 Drawing Sheets

(56) References Cited

U.S. PATENT DOCUMENTS

| | | | | |
|---|---|---|---|---|
| 3,595,728 A * | 7/1971 | Robson | G21C 11/088 | 976/DIG. 162 |
| 3,653,434 A * | 4/1972 | Andersson | G21C 13/087 | 220/585 |
| 3,734,827 A * | 5/1973 | Schilling | G21C 13/08 | 29/446 |
| 4,047,632 A * | 9/1977 | Schilling | G21C 13/08 | 220/640 |
| 4,111,327 A * | 9/1978 | Janakiev | B01J 3/04 | 52/249 |
| 4,223,496 A * | 9/1980 | Mitterbacher | B01J 3/04 | 52/249 |
| 4,322,880 A * | 4/1982 | Lampe | B23P 15/22 | 228/184 |
| 4,570,813 A * | 2/1986 | Weber | F16J 12/00 | 220/639 |
| 10,636,529 B2 * | 4/2020 | Young | G21C 5/00 | |
| 11,342,085 B2 * | 5/2022 | Hinds | E04H 7/18 | |
| 11,404,180 B2 * | 8/2022 | Anderson | B29C 64/153 | |
| 11,508,488 B2 * | 11/2022 | Ougouag | G21C 15/12 | |
| 11,791,057 B2 * | 10/2023 | Cisneros, Jr. | G21C 1/022 | 376/360 |
| 2004/0262167 A1 * | 12/2004 | Burch | C01B 3/382 | 423/652 |
| 2011/0075786 A1 * | 3/2011 | McWhirter | F28D 1/0213 | 376/405 |
| 2020/0027593 A1 * | 1/2020 | Beckett | G21C 11/028 | |
| 2021/0110944 A1 * | 4/2021 | Velez Lopez | G21C 1/10 | |
| 2021/0343431 A1 * | 11/2021 | Cisneros, Jr. | G21C 11/06 | |
| 2022/0076854 A1 * | 3/2022 | Ougouag | G21C 15/12 | |
| 2023/0112687 A1 * | 4/2023 | Eades | G21C 7/12 | 376/458 |
| 2023/0290528 A1 * | 9/2023 | Venneri | G21D 1/02 | |

OTHER PUBLICATIONS

Stewart, Ryan Hunter, et al. Streaming in a Nuclear Grade Sandwich Composite for Microreactor Shielding. No. INL/CON-24-79043-Rev000. Idaho National Laboratory (INL), Idaho Falls, ID (United States), 2024. (Year: 2024).*

Stewart, Ryan Hunter, et al. "Preliminary Analysis of a Nuclear-Grade Sandwich Composite for Transportable Microreactor Shielding." Proceedings of PHYSOR2024, San Francisco, California (2024). (Year: 2024).*

Aerojet-General Nucleonics, Report No. AGN TM-412, "Army Gas-Cooled Reactor Systems Program ML-1A Shield Optimization Study", Dec. 1965, 110 pages.

Aerojet-General Nucleonics, Report No. IDO-28550, "Army Gas-Cooled Reactor Systems Program The ML-1 Design Report", May 16, 1960, 182 pages.

Atwood et al., "Laser Engineered Net Shaping (LENS(TM)): A Tool for Direct Fabrication of Metal Parts", Conference: 17th International Congress on Applications of Lasers and Elector-Optics; Orlando, FL, Nov. 17, 1998, 9 pages.

Baranowski et al., "Deformation of Honeycomb Cellular Structures Manufactured with Laser Engineered Net Shaping (LENS) Technology, Under Quasi-Static Loading: Experimental Testing and Simulation", Additive Manufacturing, vol. 25, (2019), 10 pages.

Cai et al., "Selection of Calculation Modes in Nuclear Shielding Material Optimization", Applied Radiation and Isotopes, vol. 159, (2020), 5 pages.

Castanie et al., "Review of Composite Sandwich Structure in Aeronautic Applications", Composites Part C: Open Access (2020), doi: <https://doi.org/10.1016/j.jcomc.2020.100004>, 64 pages.

Catchpole-Smith et al., "Thermal Conductivity of TPMS Lattice Structures Manufactured Via Laser Powder Bed Fusion", Additive Manufacturing, vol. 30, (2019), 9 pages.

Chen et al., "Metaheuristic Optimization Method for Compact Reactor Radiation Shielding Design Based on Genetic Algorithm", Annals of Nuclear Energy, vol. 134, (2019), 12 pages.

Chen et al., "Multi-Objective Optimization Strategies for Radiation Shielding Design with Genetic Algorithm", Computer Physics Communications, vol. 260, 17 pages.

Cheng et al., "Investigations on Porous Media Customized by Triply Periodic Minimal Surface: Heat Transfer Correlations and Strength Performance", International Communications in Heat and Mass Transfer, vol. 129, (2021), 12 pages.

Chuvil'deev et al., "Preparation and Investigation of Ultrafine-Grained Tungsten Carbide with High Hardness and Fracture Toughness", Doklady Physics, vol. 60, No. 7, (2015), 4 pages.

Cobbinah et al., "Laser Powder Bed Fusion of Potential Superalloys: A Review", Metals, vol. 11, No. 58, (2021), 37 pages.

Dalaq et al., "Mechanical Properties of 3D Printed Interpenetrating Phase Composites with Novel Architectured 3D Solid-Sheet Reinforcements", Composites: Part A, vol. 84, (2016), 15 pages.

Ding et al., "Design of a U-Battery", [Online], Available: http://www.janleenkloosterman.nl/reports/ubattery_final_201111.pdf. [Accessed Apr. 4, 2022], Delft, Nov. 2011, PNR-131-2011-014, 462 pages.

Ding et al., "Neutronic Feasibility Design of a Small Long-Life HTR", Nuclear Engineering and Design, vol. 241, (2011), 11 pages.

El-Genk et al., "Post-Operation Radiological Source Term and Dose Rate Estimates for the Scalable Liquid Metal-Cooled Small Modular Reactor", Annals of Nuclear Energy, vol. 115, (2018), 17 pages.

Fei et al., "Radiation Protection and Shielding Analysis of the Versatile Test Reactor", Nuclear Science and Engineering, 196:sup1, (2022), 13 pages.

Hales et al., "BISON Theory Manual—The Equations Behind Nuclear Fuel Analysis (BISON Release 1.3)", Idaho National Laboratory, INL/EXT-13-29930 Rev. 3, Sep. 2016, 156 pages.

Hamzah et al., "Neutron Fluence and DPA Rate Analysis in Pebble-Bed HTR Reactor Vessel Using MCNP", IOP Conf. Series: Journal of Physics: Conference Series 962 012044, (2018), 9 pages.

Humphry-Baker et al., "Shielding Material in the Compact Spherical Tokamak", Philosophical Transactions A, vol. 377, (2019), 20 pages.

Jue et al., "Fabrication of Monolithic RERTR Fuels by Hot Isostatic Pressing", Nuclear Technology, 172:2, (2010), 8 pages.

Kenny et al., "Low Temperature Synthesis and Spark Plasma Sintering of a Boron Carbide with a Low Residual Carbon Content", Journal of the European Ceramic Society, vol. 42, (2022), 9 pages.

Kobayashi et al., "Tungsten Alloys as Radiation Protection Materials", Nuclear Instruments and Methods in Physics Research, Section A, vol. 390(3), (1997), 5 pages.

Palomino et al., "Postoperation Dose Rate Estimates for the Very-Small Long-Life, Modular Reactor", Journal of Nuclear Engineering and Radiation Science, vol. 6, Jul. 2020, 10 pages.

Park et al., "Enhancement in the Microstructure and Neutron Shielding Efficiency of Sandwich Type of 6061AI-B4C Composite Material Via Hot Isostatic Pressing", Nuclear Engineering and Design, vol. 282, (2015), 7 pages.

Rupani et al., "Design, Modelling and Manufacturing Aspects of Honeycomb Sandwich Structures: A Review", International Journal of Scientific Development and Research (IJSDR), vol. 2, No. 4, Apr. 2017, 8 pages.

Song et al., "Characterization of Alloy 709 Commercial Heats", Idaho National Laboratory, INL/EXT-21-64284, Sep. 2021, 36 pages.

Song et al., "Research on Fast Intelligence Multi-Objective Optimization Method of Nuclear Reactor Radiation Shielding", Annals of Nuclear Energy, vol. 149, (2020), 9 pages.

Srivathsan, Srihari, "Modeling, Fabrication, and Characterization of Porous Inconel 718 Structures Using Selective Laser Melting Process", The University of Texas AT Arlington, May 2020, 56 pages.

Stewart et al., "An Agent-Based Blackboard System for Multi-Objective Optimization", Journal of Computational Design and Engineering, vol. 9, No. 2, (2022), 27 pages.

Stewart et al., "Toward an Agent-Based Blackboard System for Reactor Design Optimization", Nuclear Technology, 208:5, (2022), 22 pages.

Suwoto et al., "Neutron Dose Rate Analysis on HTGR-10 Reactor Using Monte Carlo Code", IOP Conf. Series: Journal of Physics: Conference Series 962 012029, (2018), 11 pages.

(56) References Cited

OTHER PUBLICATIONS

Weidmann et al., "Laser Powder Bed Fusion Manufacturing of Aluminum Honeycomb Structures: Theory and Testing", International Journal of Mechanical Sciences, vol. 180, (2020), 18 pages.
Williamson et al., "BISON: A Flexible Code for Advanced Simulation of the Performance of Multiple Nuclear Fuel Forms", Nuclear Technology, 207:7, (2021), 28 pages.

* cited by examiner

INTEGRATED REACTOR SHIELD STRUCTURES AND INTEGRATED PRESSURE VESSEL STRUCTURES

CROSS-REFERENCE TO RELATED APPLICATION

This application claims the benefit under 35 U.S.C. § 119(e) of U.S. Provisional Patent Application Ser. No. 63/516,109, filed Jul. 27, 2023, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

This disclosure relates generally to reactor shields and more specifically relates to light reactor shields such as for use in fixed, mobile, and transportable nuclear reactors. The disclosure also may have application to transport casks for irradiated materials and nuclear fuel.

BACKGROUND

For reactor shields, gamma attenuation can be enhanced by using high proton number materials, sometimes referred to as high-Z materials. Neutron capture can be increased by using low atomic number neutron moderators that may be low-Z as well. Concrete is essentially a low-cost mixture of strongly moderating and lesser attenuators that can serve the dual objectives of shielding gammas and neutrons. Its use as a shield is ubiquitous because it is inexpensive, and because when reinforced with steel rebar, it is a high strength composite that can be both a structural "building" material and a radiation shield. Compared to lead, tungsten, boron, and iron, concrete lacks the relatively strong attenuation coefficient to be a viable light shield such as that which may be desired for fuel transport casks. For casks, the shield is the only heavy component other than the fuel itself. In a reactor, the steel vessel is also a substantial weight component.

The previous generation of stationary reactors were designed with a shield placed far away from the reactor central axis. There is no adverse consequence from this configuration for stationary reactors because there is no weight constraint. In contrast, there is a weight consequence, and hence a constraint, for transportable reactors for the following two reasons. First, stationary reactors involve two heavy structures: a reactor vessel (e.g., a pressure vessel providing structural strength to withstand stresses caused by pressure within the vessel) and a biologic shield (e.g., a structure that attenuates radiation emanating from a reactor interior within the reactor vessel and from other, activated components). When these features are included in a transportable reactor, the overall weight of a transportable reactor may be large and may result in the transportable reactor being difficult to transport. Secondly, the basic geometry for a reactor vessel and shield is annular; thus, at equal thickness, the volume and mass of a shield are roughly proportional to the mean distance of the shield from the reactor central axis. For example, a 5-cm thick tungsten shield with length of 2.5 meters weighs 14 metric tons when the inside radius is 90 cm but weighs 17 tons when the inside radius is 110 cm. This is a 22% difference.

The approximate reactor vessel radius for most micro-reactor concepts is about one meter. The approximate combined thickness of the reactor core barrel and reactor vessel is 10-20 cm. In high temperature reactors, these steel structures may encompass approximately 40% of the total weight.

SUMMARY

According to some embodiments of the disclosure, an integrated reactor shield structure includes radially adjacent layers. Each layer includes radially extending walls that define cells and a sheet that surrounds the radially extending walls. The integrated reactor shield structure also includes biologic shielding material disposed in each of the cells.

According to some embodiments of the disclosure, an integrated pressure vessel structure includes layers of sandwich composite material. Each layer includes a sheet of metallic material, and cell walls extending perpendicularly from the sheet. The sheet and the cell walls define cores therebetween. Filler material is disposed within the cores. The filler material is configured to transmit a compressive force between the layers of the sandwich composite material.

According to some embodiments of the disclose, an integrated reactor shield structure includes a first layer and a second layer. The first layer includes a first sheet of metallic material and first cell walls extending perpendicularly from the first sheet. The first cell walls and the first sheet define first cores therebetween. The first layer also includes a first biologic shielding material disposed within the first cores. The second layer is adjacent to the first layer and includes a second sheet of metallic material and second cell walls extending perpendicularly from the second sheet. The second cell walls and the second sheet define second cores therebetween. The second cell walls are offset from the first cells walls. The second layer also includes a second biologic shielding material disposed within the second cores. The second biologic shielding material overlaps the first cell walls.

BRIEF DESCRIPTION OF THE DRAWINGS

For a detailed understanding of the disclosure, reference should be made to the following detailed description, taken in conjunction with the accompanying drawings, in which like elements have generally been designated with like numerals, and wherein.

DETAILED DESCRIPTION

Figure 1A:
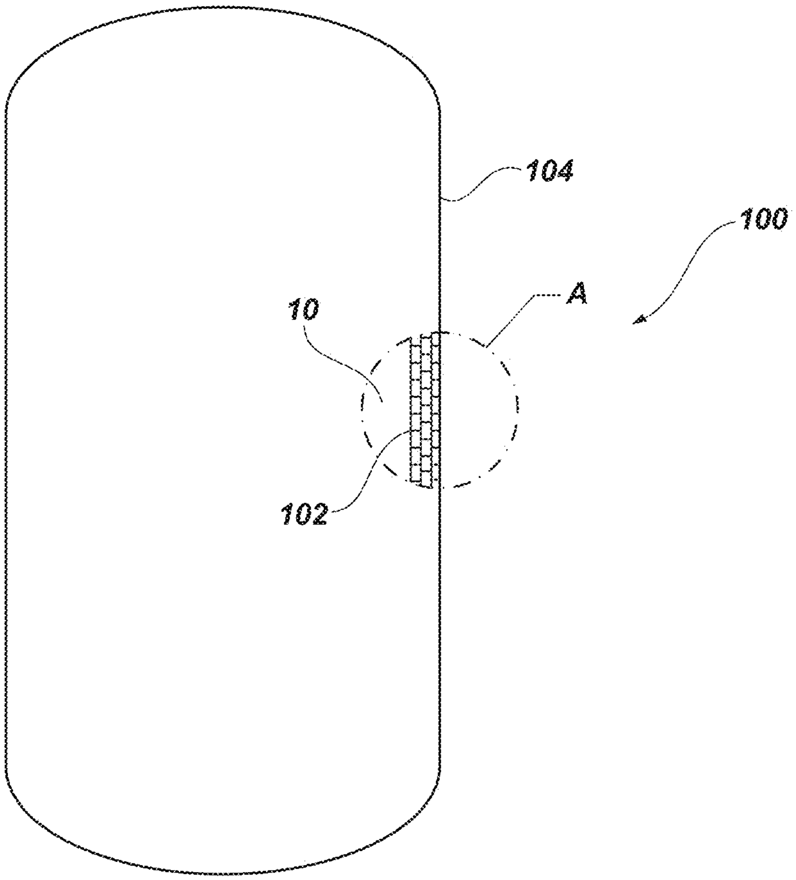
FIG. 1A shows a schematic view of an integrated reactor shield structure with a cutaway section view along circle A.

The illustrations presented herein are not actual views of any integrated reactor shield structure, or any component thereof, but are merely idealized representations, which are employed to describe embodiments of the disclosure. Accordingly, the illustrations presented herein are not necessarily to scale. Furthermore, features shown in the illustrations may be exaggerated to facilitate understanding of the features and the concepts disclosed herein.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "top," "bottom," "upper," "lower," "above," "beneath," "side," "upward," "downward," etc., is used for clarity and convenience in understanding the disclosure and accompanying drawings and does not connote or depend on any specific preference or order, except where the context clearly indicates otherwise. For example, these terms may refer to an orientation of elements of any integrated reactor shield structure when utilized in a conventional manner. Furthermore, these terms may refer to an orientation of elements of any integrated reactor shield structure as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

A sandwich composite such as those used in various aerospace applications may be fabricated by attaching two thin-but-stiff skins to a lightweight core. For example, two metallic sheets may be bonded to each side of a core to form a sandwich composite. The core may comprise an open or closed cell structure such as an array of hexagons or honeycomb structure. Other cell structures are also included in this disclosure, including but not limited to, triangular, corrugated, egg-box-shape, columnar, internal truss, or any other suitable shape. In the disclosure, through additive manufacturing processes, a modified sandwich composite may be utilized to provide an integrated reactor shield structure concomitantly comprising both a reactor vessel and a biologic shield suitable for lightweight reactor applications. The biologic shield may be a structure that attenuates radiation emanating from within the reactor vessel, from the vessel itself, and from other structural components that become activated. By utilizing a modified sandwich structure, the shield may be brought closer to the reactor's central axis which may help to achieve volume and weight savings via favorable geometry. This may provide better weight savings results than merely reducing the thickness or density of the separate various components. In this manner, the weight of the combined reactor vessel structure and biologic shields may be reduced in certain applications while maintaining required strength and shielding characteristics.

Figure 1B:
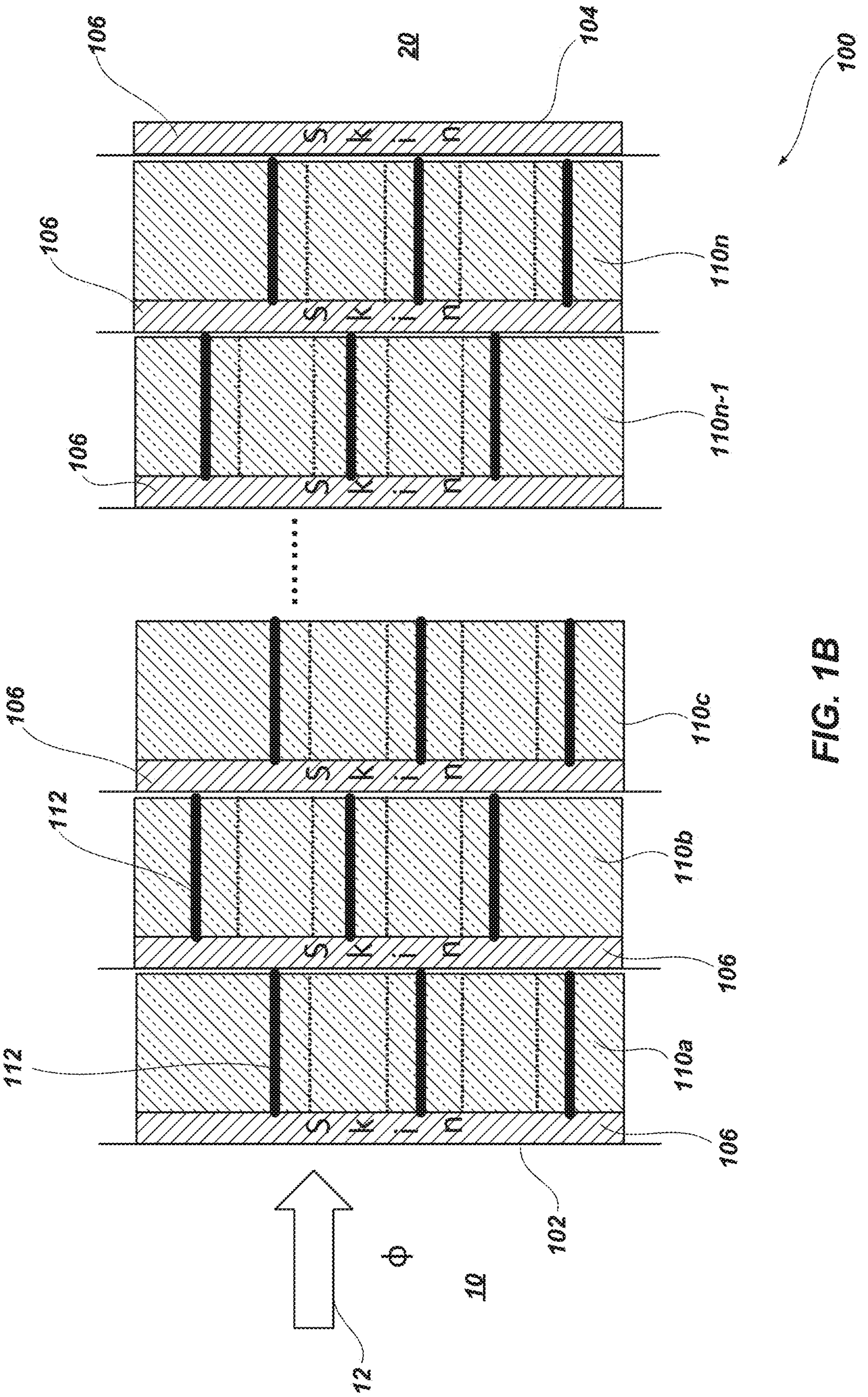
FIG. 1B shows an enlarged view of a portion of the cutaway section view along circle A according to one embodiment of the disclosure.
Figure 2A:
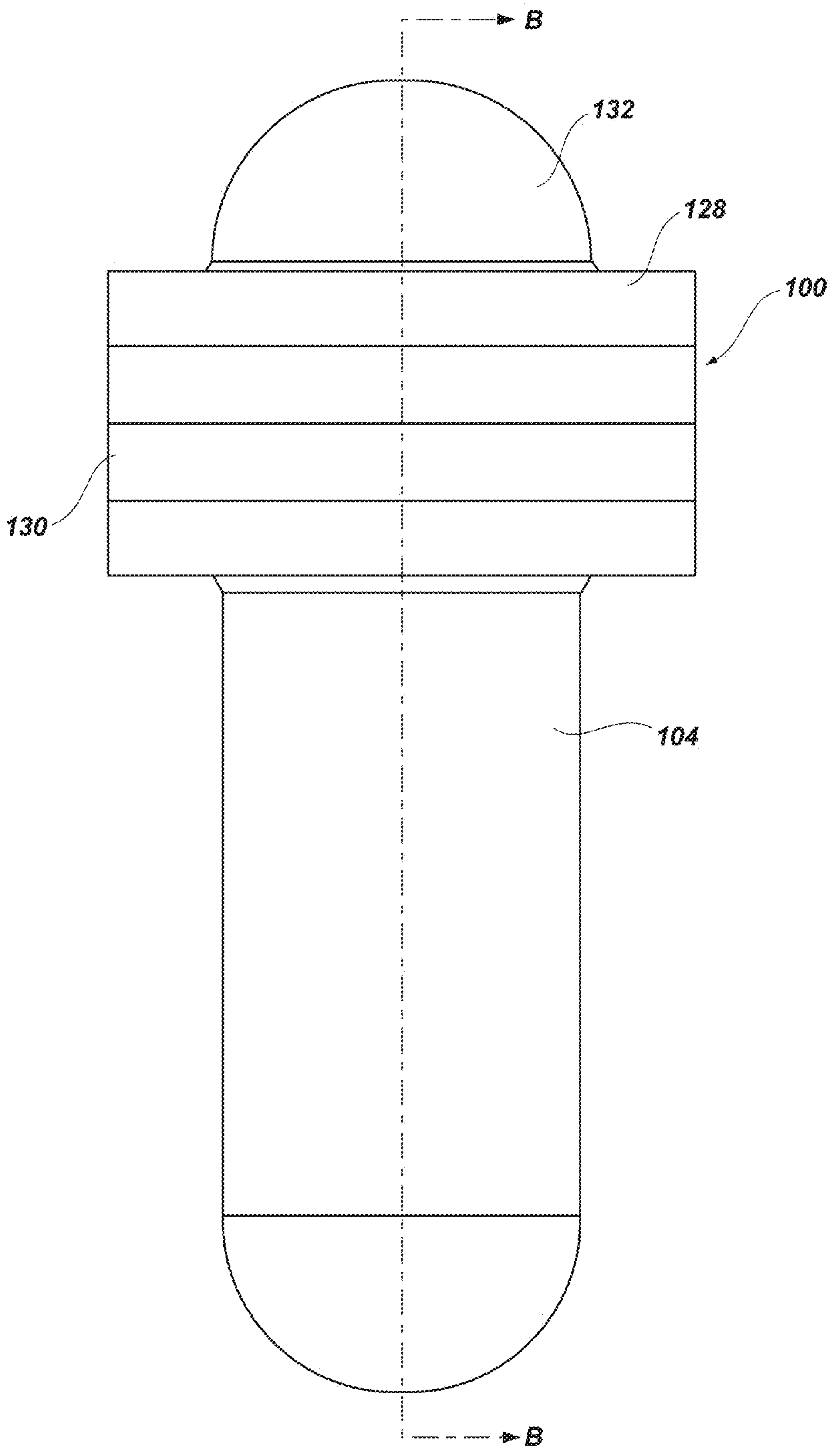
FIG. 2A shows a side view of an integrated reactor shield structure.
Figure 2B:
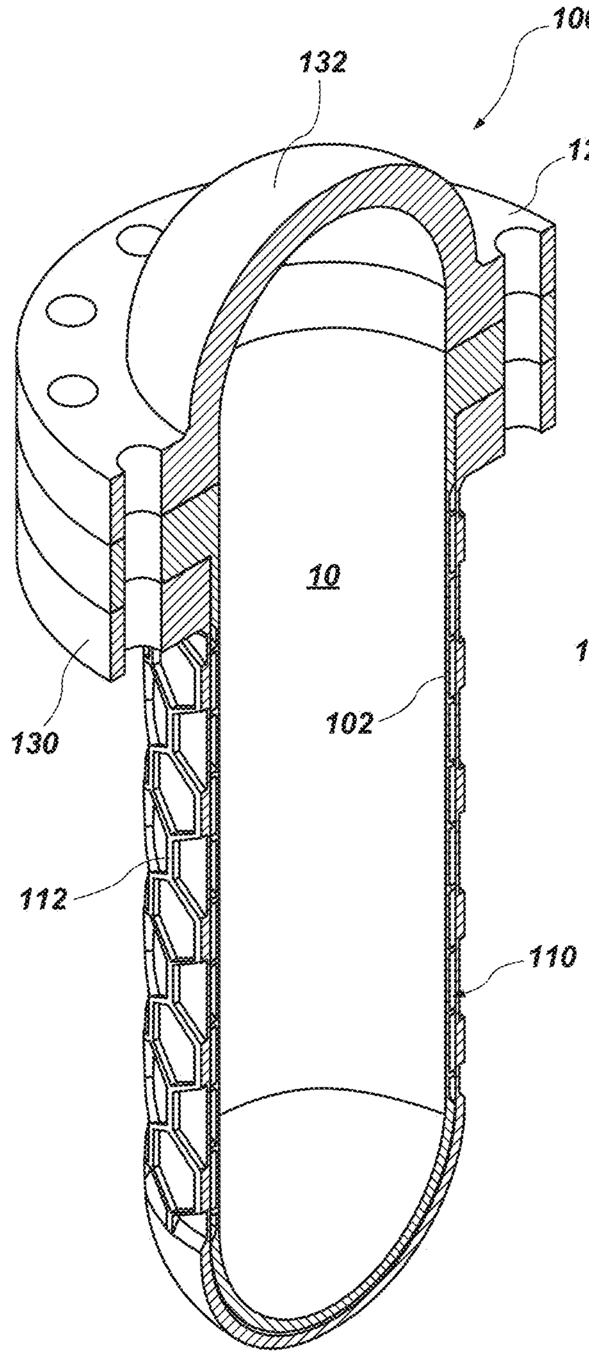
FIG. 2B shows a perspective section view of the integrated reactor shield structure of FIG. 2A taken along the line B-B and with an outer sheet removed.
Figure 2C:
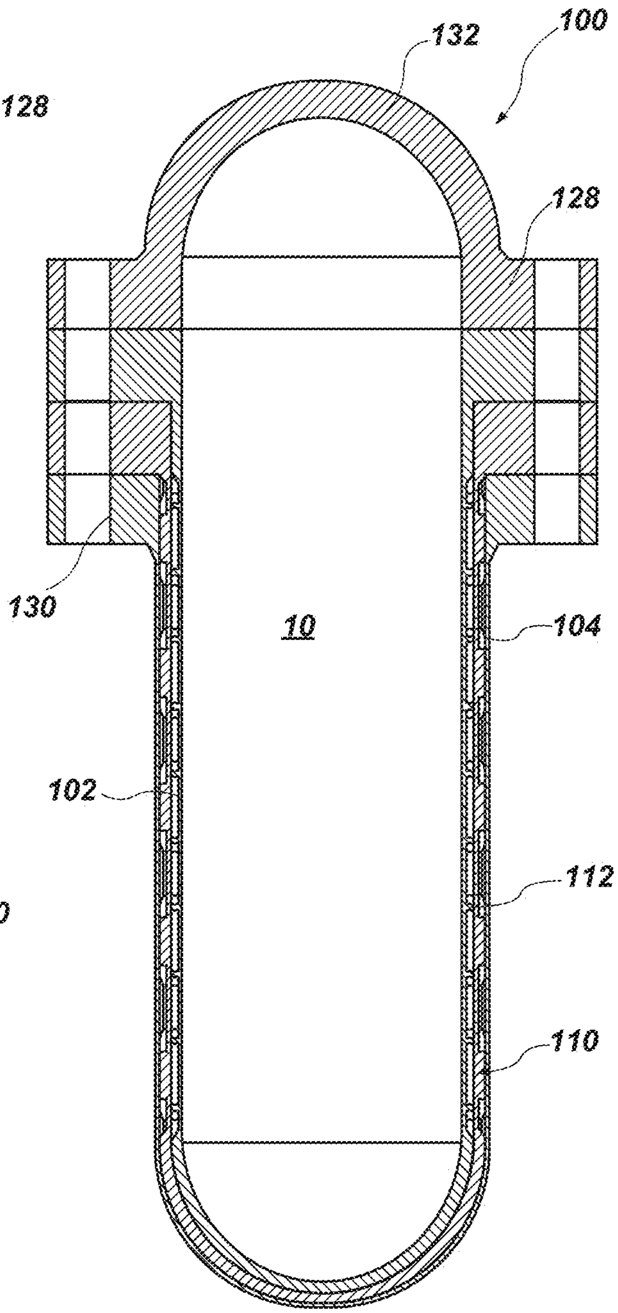
FIG. 2C shows a side view of the integrated reactor shield structure of FIG. 2A taken along the line B-B according to one embodiment of the disclosure.

FIG. 1A shows a schematic view of an integrated reactor shield structure with a cutaway section view along circle A, and FIG. 1B shows an enlarged view of the cutaway section view along circle A. FIG. 2A shows a side view of an integrated reactor shield structure, FIG. 2B shows a perspective section view of the integrated reactor shield structure of FIG. 2A taken along the line B-B and with an outer sheet removed, and FIG. 2C shows a side view of the integrated reactor shield structure of FIG. 2A taken along the line B-B. In FIGS. 1A and 1B and 2A-2C, an integrated reactor shield structure 100 may comprise layers 110*a*-110*n* of sandwich composite that together form a combined reactor vessel and biologic shield suitable for use in reactor applications. The integrated reactor shield structure 100 may comprise an inner surface 102 (i.e., an integrated reactor shield structure inner surface) that may face an interior 10 that encompasses reactor internal components that may include radioactive materials and constitutes a source of radiation 12. The integrated reactor shield structure 100 may also comprise an outer surface 104 (i.e., an environment surface) that is exposed to an environment 20 external to the integrated reactor shield structure 100.

Each of the layers 110*a*-110*n* of the integrated reactor shield structure 100 may comprise radially extending walls 112 defining a plurality of cells. The walls 112 of the first layer 110*a* may be formed substantially perpendicular to the inner surface 102. A sheet 106 (e.g., a skin) that defines the inner surface 102 may be disposed on the walls 112 of the first layer 110*a* to define the first layer 110*a*. Walls 112 of subsequent layers 110*b*-110*n* may be disposed to be offset from one another such that cells of subsequent layers 110*b*-110*n* (e.g., radially adjacent layers) are partially offset laterally (e.g., circumferentially) and/or vertically (e.g., axially) from one another. For example, the walls 112 of the second layer 110*b* are not aligned with the walls 112 of the first layer 110*a*, the walls 112 of the third layer 110*c* are not aligned with walls 112 of the second layer 110*b*, and so on. Additional sheets 106 (e.g., skins) are provided to define each of the subsequent layers 110*b*-110*n* and to define the outer surface 104 mentioned above. Thus, the walls 112 forming the cells of the integrated reactor shield structure 100 may be considered as forming "cores" of the sandwich composite material forming the integrated reactor shield structure 100, and the inner surface 102, the outer surface 104, and the sheets 106 surrounding the cores may be considered the "skins" of the sandwich composite material forming the integrated reactor shield structure 100. The number of layers 110*a*-110*n* may be selected such that the totality of the layers has sufficient strength to resist pressures of the contents therein, such as the contained reactor coolant while also sufficiently attenuating radiation leaving the reactor.

In one embodiment, the sheet 106 (e.g., skin) interior to the cell walls 112 of each layer 110*a*-110*n*, may be additively manufactured together by any suitable additive manufacturing process to form the layers 110*a*-110*n*. In other words, the cell walls 112 and the sheet 106 interior to the cell walls 112 of each layer 110*a*-110*n* may be formed integrally via an additive manufacturing process such that the cell walls 112 and the sheet 106 interior to the cell walls 112 of each layer define a unitary piece. In another embodiment, the cell walls 112 and each of sheets 106 of the layers 110*a*-110*n* may be formed separately. The cell walls 112 and the sheet 106 interior to the cell walls 112 of each of the layers 110*a*-110*n* may then be bonded or joined together. In these embodiments, each of the layers 110*a*-110*n* may thus comprise a sheet 106 printed with, or otherwise bonded to, the cell walls 112. An outermost sheet 106 defining the outer surface 104 may be additively manufactured by any suitable additive manufacturing process and may be positioned around an outermost layer 110*n*.

While each of the layers 110*a*-110*n* may be defined by cell walls 112 and a sheet 106 internal to the cell walls, the layers 110*a*-110*n* may also be defined by the cells walls 112 and a sheet 106 exterior to the cell walls. Accordingly, the layers 110*a*-110*n* may also be fabricated by forming the cell walls 112 of each of the layers 110*a*-110*n* with the sheet 106 exterior to the cell walls 112, or otherwise bonding the cell walls 112 with the sheet 106 exterior to the cell walls 112. The innermost sheet 106 defining the inner surface 102 may also be constructed via any suitable process such as via an additive manufacturing process. The innermost sheet 106 may be inserted inside the innermost layer 110*a* and may be bonded to the cell walls 112 of the innermost layer.

The layers 110*a*-110*n* may be joined (e.g., fastened) by a common member, such as via a shared flange 128 at the top head 132 of the vessel that connects to flanges 130 formed integrally with the layers 110, thereby constituting the integrated reactor shield structure 100 (shown in FIGS. 2A-2C). In another embodiment, all of the layers 110*a*-110*n* may be additively manufactured together to form the integrated reactor shield structure 100.

In another embodiment, each of the layers 110*a*-110*n* may comprise two sheets 106 and cell walls 112 defining the so-called "cores" between the two sheets 106. The two sheets 106 and the cell walls between the two sheets 106 may be additively manufactured together to form the layers 110*a*-110*n*, and then the layers 110*a*-110*n* may be assembled.

Figure 3:
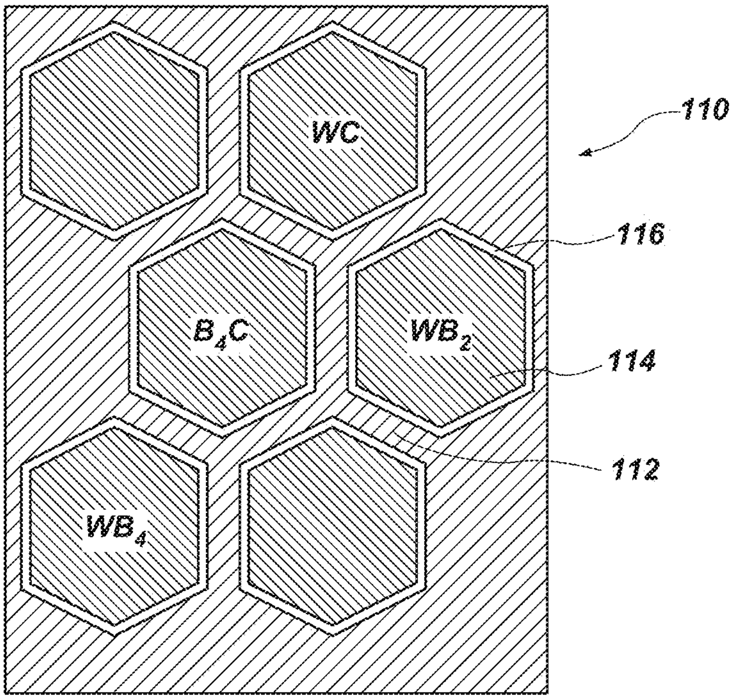
FIG. 3 shows a schematic view of a partial layer of the integrated reactor shield structure.
Figure 4:
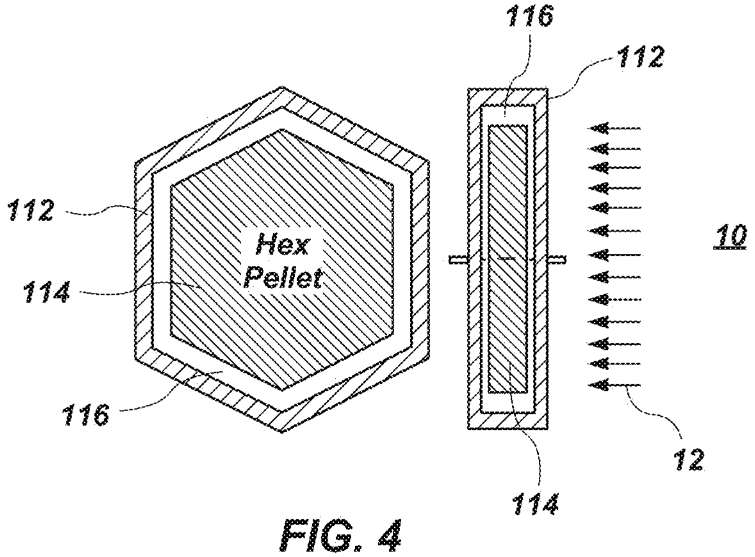
FIG. 4 shows a schematic top and side view of a cell of the integrated reactor shield structure.

FIG. 3 shows a schematic view of a partial layer 110 of the integrated reactor shield structure 100 of FIGS. 1A and 1B, and FIG. 4 shows a schematic top and side view of a cell of the integrated reactor shield structure 100. As mentioned above, the walls 112 may form cells of the core of the integrated reactor shield structure 100. In the embodiment shown in FIGS. 1A-4, the walls 112 are configured in hexagonal shapes to form hexagonal cells (or honeycomb-shaped cells) between sheets 106. However, this is not intended to be limiting as other shapes may be formed by the walls 112 in the layer 110 of the integrated reactor shield structure 100. For example, the walls 112 may form cells having a triangular, corrugated channel, linear channel, egg-box, columnar, internal truss, or any other suitable shape.

The cells formed by the walls 112 may be configured to house biologic shielding material. For example, the cells formed by the walls 112 of a layer 110 may be filled with ceramic pellets 114 of the same shape as the cell formed by the walls 112. These ceramic pellets 114 may be fabricated from materials having biologic shielding properties such as neutron and gamma-ray attenuating properties. In some embodiments, the pellets 114 may comprise biologic shielding material such as tungsten carbide (WC), tungsten diboride ($WB_2$), tungsten tetra-boride ($WB_4$), or boron carbide ($B_4C$) formed from ceramic powders which may be inserted into each of the cells formed by the walls 112 of the layer 110. In one embodiment, such ceramics may be formed into high density, very hard, and high-temperature resilient pellets using conventional powder metallurgy processes such as press-and-sintering, hot-pressing, or advanced processes, such as spark-plasma-sintering (SPS), or additive processes. Tungsten (W) has a very high density and Z-number, making it an excellent γ-ray attenuator. Boron carbide is also known for its ability to absorb neutrons without forming long-lived radionuclides which makes it attractive as an absorber material for neutron radiation. Other materials having high Z-number, high density, that are very hard, and possess high-temperature resilient properties may be used and inserted into each of the cells formed by the walls 112 of the layer 110.

In embodiments where the layers 110*a*-110*n* are formed by additively manufacturing cell walls 112 between two sheets 106, the pellets 114 may be additively manufactured concurrently with the sheets 106 and walls 112 of the integrated reactor shield structure 100. Alternatively, the pellets 114 may be added by backfilling (by pouring and vibrational packing) the cells following additive manufacturing. In the backfilling process, the cells formed by cell walls 112 are filled with ceramic powders having radiation attenuating properties, e.g., WC, $WB_2$, $WB_4$, $B_4C$. In the case of backfilling cells formed by the cells walls 112 with powders to form the pellets 114, the walls 112 and/or sheets 106 may include holes (e.g., small holes) to allow fine ceramic powders to pass through the cores of the layers 110*a*-110*n*. In some embodiments, the pellets 114 may be inserted into the cells formed by the cell walls 112 after manufacturing one or more of the layers 110*a*-110*n* of the integrated reactor shield structure 100.

In some embodiments, the pellets 114 are sized to fit into the cells formed by the walls 112 such that there is a gap 116 between the pellets 114 and the walls 112. In some instances, because boron is a neutron absorbing material, helium may be produced over time, which may cause the pellets 114 to swell. The gap 116 may accommodate such swelling to ensure integrity of the integrated reactor shield structure 100 over time. In other embodiments, instead of the gap 116, the pellets 114 may comprise sufficient porosity built into the ceramic material of the pellet (or in the poured and packed ceramic powders) to accommodate potential swelling. In some embodiments, the gap 116 may be larger in layers 110*a*-110*n* that are proximal (e.g., nearer) to the inner surface 102 as compared to layers that are proximal (e.g., nearer) to the outer surface 104. This may accommodate an expected increased helium production in inner layers of the layers 110*a*-110*n* as compared to helium production in outer layers of the layers 110*a*-110*n*. In some embodiments, the gap 116 may accommodate a difference in a coefficient of thermal expansion between the material of the layers 110*a*-110*e* (e.g., the skins 106 and cell walls 112) and the biologic shielding material of the pellets 114.

Each of the sheets 106, including the inner surface 102 and the outer surface 104, and the walls 112 of the integrated reactor shield structure 100 may comprise a metallic material. For example, the metallic material may comprise reactor grade steels. Such reactor grade steels may comprise austenitic steels such as SS709, SS304, and SS316H. Other metallic materials that are radiation-resistant and corrosion-resistant to reactor coolant may also be used such as refractory alloys, aluminum alloys, titanium alloys and nickel alloys. In some embodiments, the materials may be chosen such that the thermal expansion between the "skins" and the "cores" match (e.g., are substantially similar). In some embodiments, different layers may comprise different metallic materials.

In conventional sandwich composites having a "honeycomb" lattice, an aluminum honeycomb is formed by crimping sheet aluminum using a gear shaped rolling tool, and then cutting the resulting corrugated sheet into thin strips. The strips are then welded together to form a hexagonal lattice. In the present embodiment, the walls 112 forming the cores of the layers 110*a*-110*n* may be formed via an additive manufacturing process. Additive manufacturing approaches such as wire- or powder-fed Direct Energy Deposition (DED) enable rapid prototyping of complex shaped components from metal powders or wire and may successfully be used to form hexagonal or honeycomb shaped lattices, as well as other shapes. Such additive manufacturing processes allow the hexagonal (or other shaped) lattice to be formed in a continuous manner, increasing the strength of the lattice in the transverse directions. Furthermore, by using additive manufacturing processes to form the cores, the lattices may be made of much stronger metals than is possible using sheet corrugation methods.

In some embodiments, the walls 112 (forming the cores) may be bonded to the inner surface 102, the outer surface 104 and the sheets 106 via a hot isostatic press (HIP) process. In additional embodiments, the integrated reactor shield structure 100 may be additively manufactured such that the walls 112, the inner surface 102, the outer surface 104, and the sheets 106 are manufactured integrally into one part. In other embodiments, the walls 112 may be bonded to the inner surface 102, the outer surface 104, and the sheets 106 via a spark plasma sintering process, welding, or other suitable process or combination of processes. In some embodiments, the cores may not be welded to the skins during manufacturing.

The pellets 114 may be formed by SPS which allows for rapid sintering of powders into compacts at high temperatures and at speeds faster than traditional sintering. This allows for much purer, less crystalline amorphism, and less un-reacted precipitates. Another benefit is that SPS yields much harder ceramics than conventional methods. SPS may be used to form hexagonal pellets 114 (or other shaped pellets depending on the desired shape of the cores) from WC, $WB_2$, $WB_4$, and $B_4C$ powders. In other embodiments, SPS may be used to form solid layers of WC, $WB_2$, $WB_4$, and $B_4C$, and the layers of may be cut into a desired shape, such as a hexagonal shape, via Wire Electrical Discharge Machining (EDM) or other suitable manufacturing process to form the pellets 114. The pellets 114 may be placed within the cells, i.e., between the walls 112 of the layer 110.

To assemble the integrated reactor shield structure 100, a reactor vessel may be created by forming concentric, annular "tubes" defined by the layers 110*a*-110*n* and optionally defined by the sheet 106 defining the inner surface 102 and/or the outer surface 104 depending on the configurations of the layers 110*a*-110*n* as discussed above. Each of the tubes or layers 110*a*-110*n* may be juxtaposed to an adjacent layer. For example, the layer 110*a* may be juxtaposed to layer 110*b*, layer 110*b* may be juxtaposed to layer 110*c*, and so on. Depending on the configuration of the layers 110*a* and 110*b*, the inside layer 110*a* may be juxtaposed next to the sheet 106 defining the inner surface 102 and/or the outside layer 110*n* may be juxtaposed next to the sheet 106 defining the outer surface 104. With the tubes so arranged, a sheet 106 is disposed on each side of the cell walls 112 of each of the layers 110*a*-110*n* ensuring that the pellets 114 are contained (e.g., fixed) within the cells formed by the walls 112. In one embodiment, each of the layers 110*a*-110*n* is assembled to (e.g., attached to or bonded to) other layers 110*a*-110*n* on either side, and the whole is formed into a structure that starts with a layer 110*a* at an interior and ends with layer 110*n* at an exterior. Depending on the configuration of the layers 110*a*-110*n*, layer 110*a* may be adjoined to the sheet 106 defining the inner surface 102 and/or layer 110*n* may be adjoined to the sheet 106 defining the outer surface 104. The layers 110*a*-110*n* may optionally be fused together and optionally to the sheets 106 defining the inner surface 102 and the outer surface 104 depending on the configuration of the layers 110*a*-110*n* by joining the walls 112 to adjacent sheets 106.

As mentioned above, the cores of the various layers 110*a*-110*n* may be configured such that radially adjacent cells are not mutually aligned, but are vertically and/or laterally offset (e.g., axially and/or circumferentially offset). This allows for pellets 114 (or poured powders) of one layer 110 to overlap with walls 112 of another layer in a radial direction. This also allows for one type of pellet 114 in one of the layers 110*a*-110*n*, such as a $B_4C$, WC, $WB_2$, or $WB_4$ pellet 114, to overlap with other types of pellets 114 in other of the layers 110*a*-110*n*, such as others of the $B_4C$, WC, $WB_2$, or $WB_4$ pellets 114 (or poured powders). Thus, the layers 110*a*-110*n* may provide protective shielding from radiation 12 through the various layers 110 of the integrated reactor shield structure 100.

Figure 5:
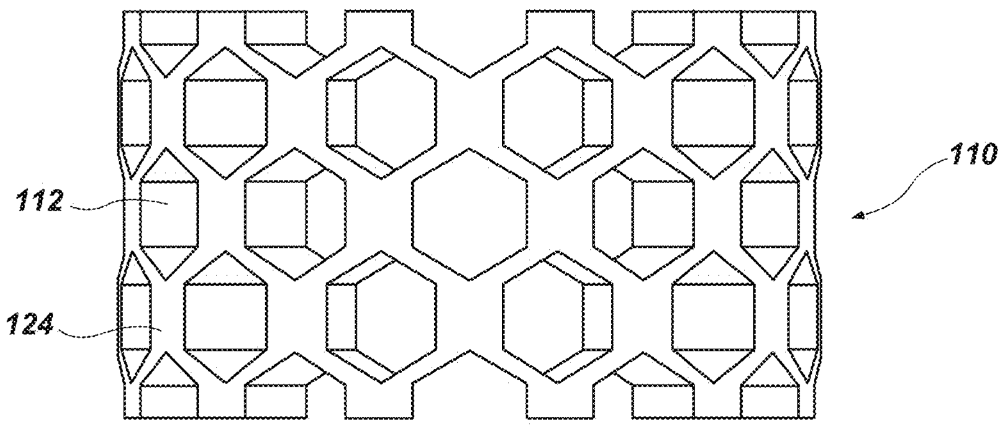
FIG. 5 shows a partial side view of a layer of the structure of the integrated reactor shield structure.
Figure 6:
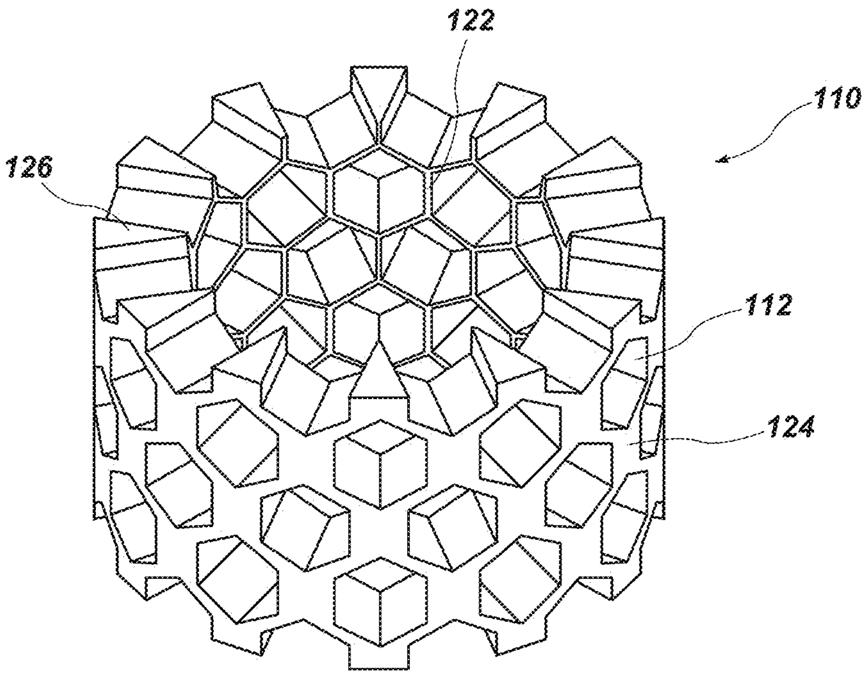
FIG. 6 shows a partial isometric view of a layer of the structure of the integrated reactor shield structure.

FIG. 5 shows a partial side view of a layer of the structure of the integrated reactor shield structure, and FIG. 6 shows a partial isometric view of a layer of the structure of the integrated reactor shield structure. As shown in FIGS. 5 and 6, a layer 110 of the integrated reactor shield structure 100 may be formed to have a non-uniform circumferential cross-section. That is, walls 112 of the layer 110 may have a different thickness 126 from an inside surface 122 of the wall 112 radially outward to an outside surface 124 of the wall. In the embodiment shown in FIGS. 5 and 6, a thickness 126 of the wall 112 may increase from the inside surface 122 to the outside surface 124. In this manner, the layer 110 may provide an inside surface 122 where the majority of an area of the inside surface provides biologic shielding, while the thickness 126 becomes larger towards the outside surface 124 to provide higher structural strength for the reactor vessel of the integrated reactor shield structure 100.

In this manner, different layers 110 of the integrated reactor shield structure 100 may comprise different geometries depending on their placement within the integrated reactor shield structure 100. Further, different parts of a single layer 110 may have different geometries and/or thicknesses within the layer 110. In some embodiments, certain layers 110 may have more shielding requirements while other layers 110 may have more structural requirements. In some embodiments, inner layers may comprise a material having high thermal conductivity to reduce temperature gradients within the inner layer.

Referring to FIGS. 1A-6, the different layers 110 of the integrated reactor shield structure 100 may comprise differences in the pellets 114. For example, the potential for swelling in the $B_4C$ pellets 114 may be greatest in the inner layers 110, i.e., layers closer to the interior 10. Thus, the pellets 114 may be formed to provide a larger gap 116 between the walls 112 and pellets 114 on the inner layers 110. Alternatively, the pellets 114 may be formed with a higher porosity on inner layers 110 of the integrated reactor shield structure 100. The outer layers 110, i.e., layers farther from the interior 10, will experience attenuated neutron fluxes and thus will require less internal porosity or a smaller gap 116 for storing helium as compared to the inner layers.

In some embodiments, the outer layers 110 may be designed conservatively such that strength was preserved while the inner layer(s) 110 would be allowed to experience significant neutron embrittlement of the metallic material (e.g., steel) and swelling of the pellets 114. In this case, bonding between inner and outer layers may be intentionally made loose. The outer layers 110 may thus be exposed only to the flux attenuated by the inner layer(s) 110. The outer layers 110 therefore may not be exposed to fluence levels sufficiently high to cause cracks in the steel or swelling of the pellets 114.

Multiple layers 110 may also allow for mitigation of γ-ray streaming through gaps between the pellets 14 and the walls 112. The layering of the cells formed by the walls 112 (e.g., hexagonal honeycombs) may be made such that the steel walls 112 of an inner layer of the layers 110*a*-110*n* are neighboring a high-density $WB_4$ pellet in an outer layer of the layers 110*a*-110*n*. In this way, successive layers ensure that the integrated reactor shield structure 100 is free of any γ-ray streaming paths. In some embodiments, some of the layers 110*a*-110*n* may comprise different shielding material pellets 114 than other layers. In one embodiment, the inner layer(s) may comprise $B_4C$ pellets 114. Outer layer(s) may comprise $WB_4$ layers that may be placed after the inner $B_4C$ layer(s). The optimal number and combination of layers may be based on a desired application including a predetermined amount of shielding and structural strength.

In some embodiments, the biologic shielding material may also contribute to an overall strength of the integrated reactor shield structure. The biologic shielding material, such as high-density $WB_4$ or $B_4C$ may be a relatively hard, incompressible, ceramic type material. Accordingly, the biologic shielding material may transmit a radial compressive load, such as caused by an internal pressure within the integrated reactor shield structure, from a more interior layer to a more exterior layer of the integrated reactor shield structure. This facilitates load sharing between the layers of the integrated reactor shield structure.

In some embodiments, the integrated reactor shield structure may be used as a pressure vessel in applications that do not require biologic shielding. Accordingly in such applications, the biologic shielding material may be replaced with any suitable filler material to transmit the radial compressive load, such as a ceramic material, a metal/ceramic composite material, or the like. In such application, the integrated reactor shield structure may be considered an integrated pressure vessel structure.

Figure 7:
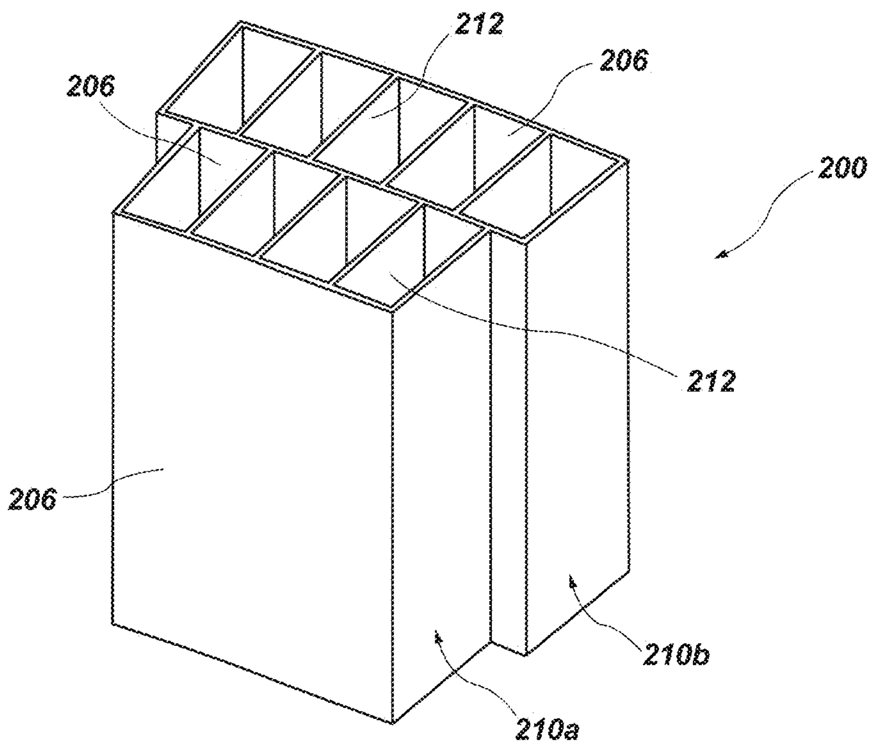
FIG. 7 shows a partial isometric view of layers of a structure of an integrated reactor shield structure.
Figure 8:
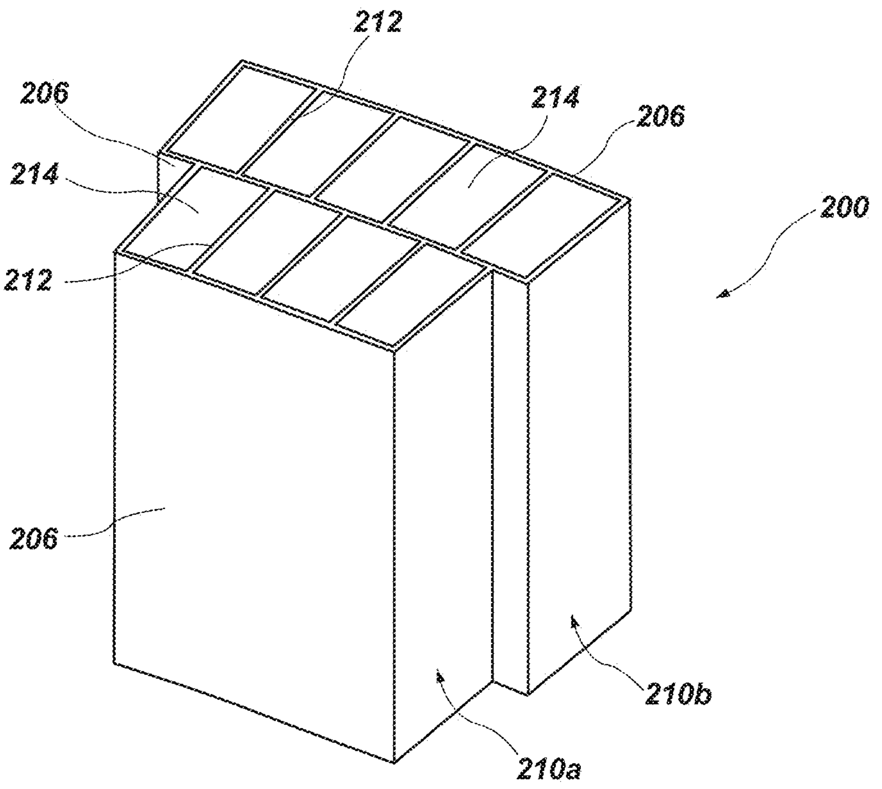
FIG. 8 shows a partial isometric view of layers of a structure with biologic shielding of an integrated reactor shield structure.

FIG. 7 shows a partial isometric view of layers of a structure of an integrated reactor shield structure, and FIG. 8 shows a partial isometric view of layers of a structure with biologic shielding of an integrated reactor shield structure. To avoid repetition, not all features (e.g., structures, materials, regions, devices) shown in FIGS. 7 and 8 are described in detail herein. Rather, unless described otherwise below, in FIGS. 7 and 8, a feature designated by a reference numeral that is a 100 increment of the reference numeral of a feature previously described with reference to FIGS. 1A-6 will be understood to be substantially similar to the previously described feature except as otherwise described herein. By way of non-limiting example, unless described otherwise below, features designated by the reference numerals 206, 212 in FIGS. 7 and 8 respectively will be understood to be substantially similar to the sheets 106 and cell walls 112 previously described herein with reference to FIGS. 1A-6 except where otherwise indicated.

In FIGS. 7 and 8, two partial layers 210*a*, 210*b* of an integrated reactor shield structure 200 are shown having cell walls 212 between sheets 206 to form the respective layers 210*a*, 210*b*. It is to be understood that layers 210*a*, 210*b* would continue to extend circumferentially and longitudinally to form complete layers of the integrated reactor shield structure 200. Only part of the layers 210*a*, 210*b* are shown to facilitate understanding. Additionally, other layers may be included in the integrated reactor shield structure 100 external to and/or internal of the layers 210*a*, 210*b*. In this embodiment, the cell walls 212 are formed to extend longitudinally and radially between two sheets 206, forming cells that have a shape of a linear channel extending longitudinally within the respective layers 210*a*, 210*b*. Similar as described above, the cell walls 212 in the second layer 210*b* are offset from (e.g., not aligned with) the cell walls 212 of the first layer 210*a*.

In the embodiment shown in FIGS. 7 and 8, the linear channel formed by the cell walls 212 may have a cross-sectional area of a circular section of a hollow cylinder. A circular section of a hollow cylinder may be defined as an area from an outside diameter to an inside diameter of the hollow cylinder over a given circumferential angle of the hollow cylinder. Here, the outer and inner diameters are defined by the sheets 206, and the angle of the circular section may be defined by neighboring cell walls 212. Depending on a diameter of the sheets 206 defining the layers 210*a*, 210*b*, the cross-sectional area of the linear channel formed by the cell walls 212 may appear substantially rectangular.

The linear channel formed by the cell walls 212 is not limited to the shape described above and shown in FIGS. 7 and 8. For example, the cell walls may be configured to form the linear channels to each have a substantially triangular (or corrugated) cross-sectional shape. In some embodiments, the linear channels may take on different cross-sectional shapes. For example, some linear channels may exhibit a substantially triangular (or corrugated) cross-sectional shape while other linear channels may exhibit a substantially rectangular cross-sectional shape.

With the cells being in the shape of a linear channel, the insertion of biologic shielding (or other filler material) may be facilitated. In the embodiment shown in FIG. 8, columns 214 of biologic shielding material, such as the biologic shielding materials discussed above, may be formed and inserted into each of the longitudinal channels. The columns 214 of biologic shielding material may have a cross-sectional shape that is substantially similar to those of the linear channels formed by the cell walls 212. In this embodiment, the columns 214 may comprise a cross-sectional shape of a circular section of a hollow cylinder. Because the cell walls 212 of the first layer 210*a* are not aligned with the cell walls 212 of the second layer, the columns 214 of one of the first layer 210*a* overlap with the cell walls 212 of the second layers 210*b* in a radial direction. This may help ensure biologic shielding in the integrated reactor shield structure 200 and may help transfer a compressive load from the first layer 210*a* to the second layer 210*b*.

In some embodiments, the columns 214 of biologic shielding material (or other filler material) may be formed into a solid block having a shape corresponding to the linear channels formed by the cell walls 212. The columns 214 may then be inserted into the longitudinal channels. In some embodiments, the columns 214 of biologic shielding material may be formed from a powder which is poured into the linear channels formed by the cell walls 212. The powder may be solidified within the linear channels through any suitable method such as by adding a reactive reagent, adding a solvent, sintering, vibrational packing, or the like. In such embodiments, the cell walls may be configured to form non-linear channels, such as a corrugated channel, while still facilitating insertion of the biologic shielding material into the channels.

The above-described embodiments of the disclosure may thus provide a relatively lightweight pressure vessel that can also provide biologic shielding of radioactive material stored therein. The above-described embodiments of the disclosure may provide several benefits. For example, a typical sandwich composite may have 75-90% of its available cell volume unfilled (e.g., void). In the present embodiments, the cell volumes may be substantially filled with the biologic shielding material to provide integrated shielding within the sandwich composite. Thus, replacing the reactor vessel with a sandwich composite of equal volume could potentially reduce the weight by approximately 30-40% in certain applications, such as a micro-reactor or fission battery (a concept for standardized, unattended, reliable, economical, and easily replaceable sub-sized advanced reactors). The above-described embodiments of the disclosure may also be used for cryogenic storage or in the petroleum industry as highly transportable high-pressure vessels.

By utilizing a sandwich composite formed with high strength material via additive manufacturing processes and by utilizing ceramic shielding material within the voids of the sandwich composite, the resulting integrated reactor shield structure (e.g., reactor shield structures 100, 200) provides sufficient strength and shielding at a significantly reduced weight compared to conventional designs. This integrated reactor shield structure may thus be referred to as Nuclear Grade Sandwich Composite (NGSC).

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. An integrated reactor shield and pressure vessel structure for a nuclear reactor, the integrated reactor shield and pressure vessel structure comprising:

radially adjacent layers, each layer comprising radially extending walls defining cells and a sheet surrounding the radially extending walls, the radially extending walls and the sheet being formed from steel, a steel alloy, an aluminum alloy, a titanium alloy, or a nickel alloy, and each of the cells comprising a linear channel extending longitudinally along substantially an entire length of each layer; and biologic shielding material disposed in each of the cells, the radially adjacent lavers each comprising an annular flange, the annular flange of each of the layers being fastened to one another.

2. The integrated reactor shield and pressure vessel structure of claim 1, wherein the cells comprise a repeating shape, the repeating shape comprising a triangular channel, rectangular channel, or corrugated channel.

3. The integrated reactor shield and pressure vessel structure of claim 1, wherein the radially adjacent layers comprise a first layer and at least a second layer radially adjacent to the first layer, and wherein the cells of the first layer are offset in a circumferential direction from the cells of the at least a second layer.

4. The integrated reactor shield and pressure vessel structure of claim 1, wherein the radially adjacent layers comprise a first layer, and wherein the radially extending walls defining the cells of the first layer increase in thickness radially from an inside surface of the radially extending walls to an outside surface of the radially extending walls.

5. The integrated reactor shield and pressure vessel structure of claim 1, wherein the biologic shielding material comprises one or more of tungsten carbide (WC), tungsten diboride ($WB_2$), tungsten tetra-boride ($WB_4$), or boron carbide ($B_4C$).

6. The integrated reactor shield and pressure vessel structure of claim 1, wherein the biologic shielding material exhibits porosity for storing helium.

7. The integrated reactor shield and pressure vessel structure of claim 1, wherein the biologic shielding material is sized within the cells to leave a gap between the radially extending walls of the cells and the biologic shielding material to allow helium storage.

8. The integrated reactor shield and pressure vessel structure of claim 1, wherein the sheet of each layer is bonded to the radially extending walls.

9. The integrated reactor shield and pressure vessel structure of claim 1, wherein columns of the biologic shielding material are disposed within the linear channels.

10. The integrated reactor shield and pressure vessel structure of claim 1, wherein the linear channels comprise a cross-sectional area exhibiting a shape of a circular section of a hollow cylinder.

11. The integrated reactor shield and pressure vessel structure of claim 1, wherein the linear channels comprise a cross-sectional area exhibiting a triangular shape.

12. The integrated reactor shield and pressure vessel structure of claim 1, wherein the linear channels comprise a cross-sectional area exhibiting a rectangular shape.

13. The integrated reactor shield and pressure vessel structure of claim 1, wherein the linear channels exhibit a corrugated shape.

14. A pressure vessel structure integrating a reactor shield comprising:

layers of sandwich composite material, each layer comprising:

a sheet of metallic material, and cell walls of the metallic material, the cell walls extending radially from the sheet, the sheet and the cell walls defining cores therebetween, the cores comprising longitudinally extending channels that each extend along substantially an entire length of each layer; and filler material disposed within the cores, the filler material being configured to transmit a compressive force between the layers of sandwich composite material, the layers of sandwich composite material each comprising an annular flange, the annular flange of each of the layers of sandwich composite material being fastened to one another.

15. The pressure vessel structure of claim 14, wherein the filler material exhibits a column or internal truss shaped to correspond to the longitudinally extending channels.

16. The pressure vessel structure of claim 15, wherein the longitudinally extending channels comprise a cross-sectional area exhibiting a shape of a circular section of a hollow cylinder.

17. An integrated reactor shield and pressure vessel structure comprising:

a first layer comprising:

a first sheet of metallic material, first cell walls extending radially from the first sheet, the first cell walls and the first sheet defining first cores therebetween, each first core being configured as a first channel extending longitudinally along substantially an entire length of the integrated reactor shield and pressure vessel structure, and a first biologic shielding material disposed within the first cores; and a second layer adjacent to the first layer, the second layer comprising:

a second sheet of metallic material, second cell walls extending radially from the second sheet, the second cell walls and the second sheet defining second cores therebetween, each second core being configured as a second channel extending longitudinally along substantially the entire length of the integrated reactor shield and pressure vessel structure, and the second cell walls being circumferentially offset from the first cell walls, and a second biologic shielding material disposed within the second cores, the second biologic shielding material overlapping the first cell walls, the first and second layers each comprising an annular flange, the annular flange of each of the first and second layers being fastened to one another.

18. The integrated reactor shield and pressure vessel structure of claim 17, wherein the first biologic shielding material and the second biologic shielding material comprise one or more of tungsten carbide (WC), tungsten diboride ($WB_2$), tungsten tetra-boride ($WB_4$), or boron carbide ($B_4C$).

19. The integrated reactor shield and pressure vessel structure of claim 18, wherein the first biologic shielding material exhibits a different material composition than the second biologic shielding material.

20. The integrated reactor shield and pressure vessel structure of claim 17, wherein the first and second channels have a cross-sectional area exhibiting a shape of a circular section of a hollow cylinder.

21. The integrated reactor shield and pressure vessel structure of claim 17, wherein the first and second channels have a cross-sectional area exhibiting a triangular shape.

22. The integrated reactor shield and pressure vessel structure of claim 17, wherein the first and second channels have a cross-sectional area exhibiting a rectangular shape.

23. The integrated reactor shield and pressure vessel structure of claim 17, wherein the first and second channels have a corrugated shape.

* * * * *